United States Patent
Wang et al.

(10) Patent No.: US 10,502,984 B2
(45) Date of Patent: Dec. 10, 2019

(54) ELECTRONIC INK SEALING CHAMBER, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Mingchao Wang, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 9 days.

(21) Appl. No.: 15/572,680

(22) PCT Filed: May 5, 2017

(86) PCT No.: PCT/CN2017/083254
§ 371 (c)(1),
(2) Date: Nov. 8, 2017

(87) PCT Pub. No.: WO2018/032803
PCT Pub. Date: Feb. 22, 2018

(65) Prior Publication Data
US 2018/0284489 A1    Oct. 4, 2018

(30) Foreign Application Priority Data

Aug. 19, 2016    (CN) .......................... 2016 1 0697077

(51) Int. Cl.
*G02B 26/00* (2006.01)
*G02F 1/01* (2006.01)
(Continued)

(52) U.S. Cl.
CPC ............ *G02F 1/0107* (2013.01); *G02F 1/167* (2013.01); *G02F 1/1676* (2019.01)

(58) Field of Classification Search
CPC ........ A61B 17/32002; A61B 2217/005; A61B 5/150206; A61B 5/154; A61B 5/01;
(Continued)

(56) References Cited

U.S. PATENT DOCUMENTS 5,368,673 A * 11/1994 Okuda .................. C04B 37/005
156/273.7
2004/0135763 A1    7/2004 Kaneko et al.
(Continued)

FOREIGN PATENT DOCUMENTS

CN    103454806 A    12/2013
CN    103941391 A    7/2014
(Continued)

OTHER PUBLICATIONS

International Search Report and Written Opinion dated Jul. 28, 2017; PCT/CN2017/083254.
(Continued)

*Primary Examiner* — Brandi N Thomas (57) ABSTRACT

An electronic ink sealing chamber, a manufacturing method thereof and a display device are provided. The electronic ink sealing chamber includes: a housing and electronic ink sealed inside the housing, a plurality of electrode groups being provided on inner sides of the housing, each of the electrode groups including a first electrode and a second electrode provided opposite to the first electrode, a connection line between a center of the first electrode and a center of the second electrode of each of the electrode groups being a line of centers, and any two of lines of centers of the
(Continued)

plurality of electrode groups being not parallel to each other. When these lines of centers are in a same plane, they are intersected with each other.

19 Claims, 8 Drawing Sheets

(51) Int. Cl.
  *G02F 1/1676* (2019.01)
  *G02F 1/167* (2019.01)
(58) Field of Classification Search
  CPC .................. A61B 5/202; A61B 5/6808; A61B 2017/22008; A61B 2017/22024; A61B 2017/308; A61B 2090/378; A61B 2560/0219; A61B 2562/0209; A61B 5/0031; A61B 5/0478; A61B 5/0492; A61B 5/0531; A61B 5/0535; A61B 5/6803; A61B 5/686; G02F 1/167; G02F 1/0107; G02F 1/13334; G02F 1/155; G02F 1/161; G02F 2001/1676
  USPC ........ 359/237, 242, 265–267, 290–292, 295, 359/296, 298
  See application file for complete search history.

(56) References Cited

U.S. PATENT DOCUMENTS

2013/0321720 A1    12/2013  Inada
2016/0301921 A1*  10/2016  Zhang ................ G02B 26/004

FOREIGN PATENT DOCUMENTS

| CN | 106054489 A | 10/2016 |
| JP | 2001-174853 A | 6/2001 |
| JP | 2006-091546 A | 4/2006 |
| JP | 2009-031370 A | 2/2009 |
| JP | 2009-122192 A | 6/2009 |
| JP | 2009-122198 A | 6/2009 |
| JP | 2009-128766 A | 6/2009 |
| JP | 2009-271317 A | 11/2009 |
| JP | 2013-222022 A | 10/2013 |

OTHER PUBLICATIONS

The First Chinese Office Action dated Aug. 17, 2017; Appln. No. 201610697077.8.

* cited by examiner

ELECTRONIC INK SEALING CHAMBER, MANUFACTURING METHOD THEREOF AND DISPLAY DEVICE

At least one embodiment of the present disclosure relates to an electronic ink sealing chamber, a manufacturing method thereof and a display device.

BACKGROUND

In the field of display, electronic paper display technology has been developed increasingly. The electronic paper display technology may be implemented in various ways, including electronic ink/electronic printing ink (E-ink) microcapsule electrophoresis technology and reverse sphere technology, for example. The E-ink microcapsule electrophoresis technology is most widely adopted. Both of the technologies achieve displaying by controlling a rotation direction of a spherical particle including a black portion and a white portion.

SUMMARY

At least one embodiment of the present disclosure relates to an electronic ink sealing chamber, a manufacturing method thereof and a display device, so as to enable significantly decreasing a loss of contrast ratio in different viewing angles, improving a picture quality in different viewing angles, and significantly improving a product performance and a product quality.

At least one embodiment of the present disclosure provides an electronic ink sealing chamber, including a housing and electronic ink sealed inside the housing. A plurality of electrode groups is provided on inner sides of the housing, each of the electrode groups includes a first electrode and a second electrode provided opposite to the first electrode, a connection line between a center of the first electrode and a center of the second electrode of each of the electrode groups is a line of centers, and any two of lines of centers of the plurality of electrode groups are not parallel to each other.

At least one embodiment of the present disclosure further provides a manufacturing method of an electronic ink sealing chamber, including:

forming at least one electrode on a sub-housing;

bonding a plurality of sub-housings each provided with the at least one electrode, together, to form a chamber, and sealing electronic ink inside the chamber having been formed;

the at least one electrode being positioned inside the sealing chamber to constitute a plurality of electrode groups therein; each of the electrode groups including a first electrode and a second electrode provided opposite to the first electrode, a connection line between a center of the first electrode and a center of the second electrode of each of the electrode groups being a line of centers, and any two of lines of centers of the plurality of electrode groups being not parallel to each other.

At least one embodiment of the present disclosure further provides a display device including a plurality of electronic ink sealing chambers. Each of the plurality of electronic ink sealing chambers can be the electronic ink sealing chamber described in any of the foregoing embodiments of the present disclosure, and the plurality of electronic ink sealing chambers are bonded together to form a combined body.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
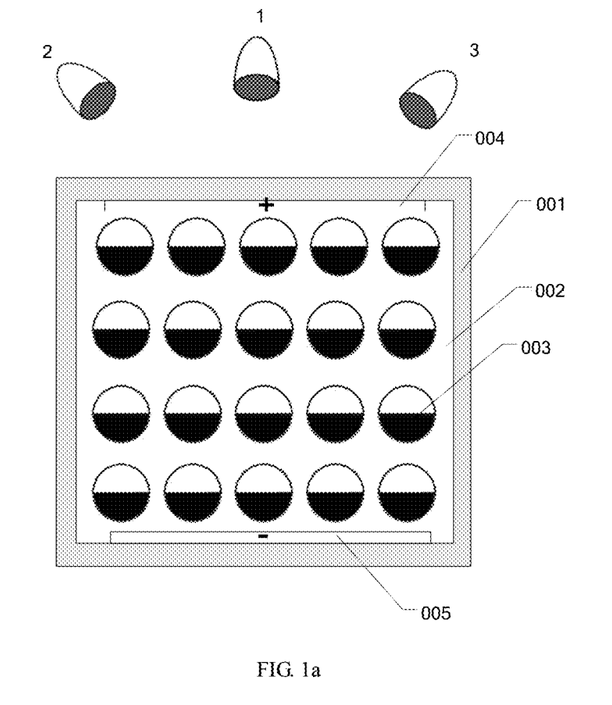
FIG. 1a is a cross-sectional schematic view of an electronic ink sealing chamber.
Figure 1B:
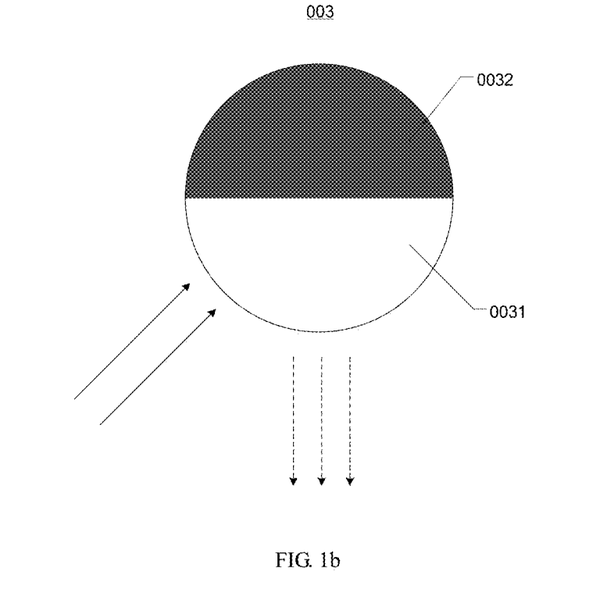
FIG. 1b is a schematic view illustrating light irradiating a white portion of a charged particle and the white portion reflecting the light.
Figure 1C:
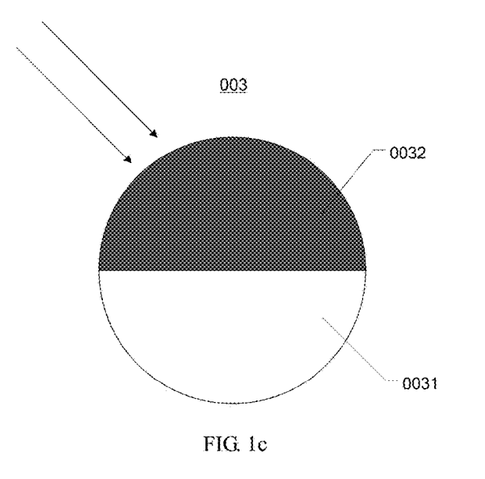
FIG. 1c is a schematic view illustrating light irradiating a black portion of the charged particle and the black portion absorbing the light without reflecting the light.

In the technology of electronic paper display, as illustrated in FIG. 1a, electronic ink (E-Ink) 002 is provided inside a housing 001. In a sub-pixel, electrodes 004 and 005 for driving charged particles 003 of the electronic ink (electronic printing ink) 002 to rotate are provided in parallel to form a vertical electric field. The charged particles 003, each being spherical, are substantially horizontally arranged under an effect of the electrodes 004 and 005. FIG. 1a illustrates only one sub-pixel, and a plurality of sub-pixels can be included inside the housing 001. The charged particle 003 can be as illustrated in FIGS. 1b and 1c. The electronic ink 002 can include the charged particle 003, the charged particle 003 includes a white portion 0031 and a black portion 0032, and charges carried by the white portion and charges carried by the black portion are asymmetrical so that the charged particle sphere maintains one type of polarity as a whole, rather than electroneutrality. For example, when the white portion 0031 of the charged particle (charged sphere) 003 of FIG. 1 carries negative charges and the black portion carries positive charges, the charged sphere carries either positive charges or negative charges as a whole, so that a like charges repelling action among spheres can be utilized to prevent the spheres from gathering. As illustrated in FIG. 1b, when light irradiates on the white portion, the light is reflected, and there is light emitting. As illustrated in FIG. 1c, when light irradiates on the black portion, the light is absorbed and there is no light emitting.

Figure 1D:
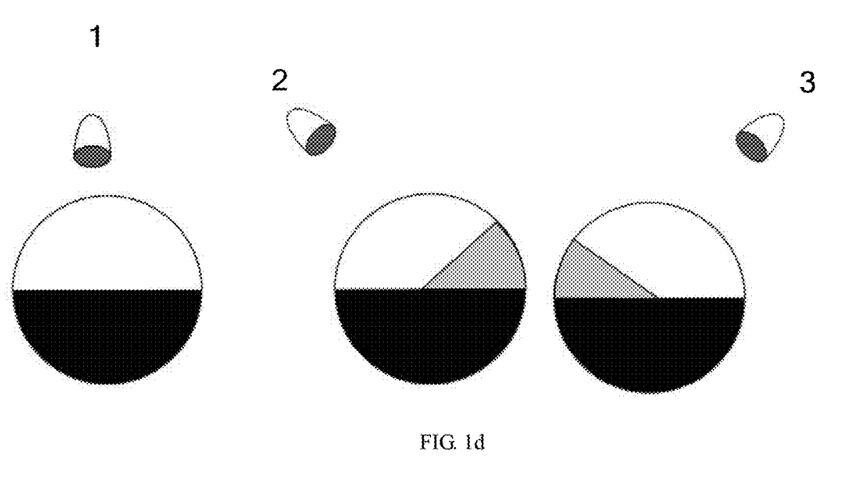
FIG. 1d is a schematic view of light reflection regions of the charged particle of the electronic ink sealing chamber in FIG. 1 in three viewing angles.

A conventional electronic paper display technique is affected by a vertical electrical field distribution, all of the charged particles are horizontally arranged, and a local region of the charged particle is blocked when an image is viewed from the right side and the left side. As illustrated in FIGS. 1a and 1d, a contrast ratio when the image is viewed in a second viewing angle 2 or a third viewing angle 3 is worse than a contrast ratio when the image is viewed in a first view angle 1. Thus, when the image is viewed in different viewing angles not perpendicular to the image, there will be a difference in the ability of the spherical charged particle reflecting external light, as compared to the case where the image is viewed in a direction perpendicular to the image. Therefore, when the image is viewed in different viewing angles, the white/black contrast (WBC) will be gradually faded, which necessarily results in poor viewing effects. The ability of reflecting ambient light when the image is viewed in a direction not perpendicular to the image is worse than the ability of reflecting ambient light when the image is viewed in a direction perpendicular to the image. In macroscopic view, this is represented as a distortion of a certain extent in the contrast ratio of the image when the image is viewed in the direction which is not perpendicular to the image.

At least one embodiment of the present disclosure provides an electronic ink sealing chamber, including a housing and electronic ink sealed inside the housing. A plurality of electrode groups is provided on inner sides of the housing, each of the electrode groups includes a first electrode and a second electrode provided opposite to the first electrode, a connection line between a center of the first electrode and a center of the second electrode of each of the electrode groups is a line of centers, and any two of lines of centers of the plurality of electrode groups are not parallel to each other. The lines of centers of the plurality of electrode groups, when located in a same plane, are intersected with each other.

At least one embodiment of the present disclosure provides a manufacturing method of an electronic ink sealing chamber, including: forming at least one electrode on a sub-housing; bonding a plurality of sub-housings each provided with the at least one electrode, together, to form a chamber; and sealing electronic ink in the chamber having been formed. The at least one electrode is positioned inside the sealing chamber to constitute a plurality of electrode groups therein, each of the electrode groups includes a first electrode and a second electrode provided opposite to the first electrode, a connection line between a center of the first electrode and a center of the second electrode of each of the electrode groups is a line of centers, and any two of lines of centers of the plurality of electrode groups are not parallel to each other. For example, the lines of centers of the plurality of electrode groups are intersected with each other.

The electronic ink sealing chamber provided by the at least one embodiment of the present disclosure enables a display device including the electronic ink sealing chamber, in microscopic view, to involve no significant distortion in a contrast ratio of an image when the image is viewed in a viewing angle which is not equal to zero (that is, the image is viewed in a direction which is not perpendicular to the image), so as to enable significantly decreasing a loss of contrast ratio in different viewing angles, improving a picture quality in different viewing angles, and significantly improving a product performance and a product quality.

In the following, further explanations will be given with reference to several embodiments.

Embodiment 1

Figure 2:
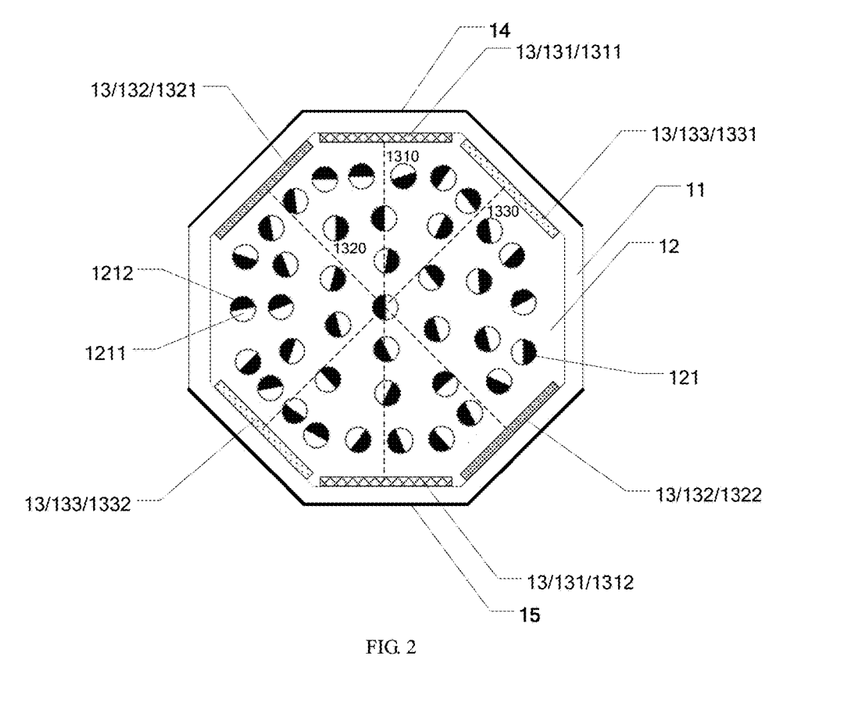
FIG. 2 is a cross-sectional schematic view of an electronic ink sealing chamber provided by an embodiment of the present disclosure.

As illustrated in FIG. 2, the present embodiment provides an electronic ink sealing chamber, including a housing 11 and electronic ink (E-Ink) 12 sealed inside the housing 11; a plurality of electrode groups is provided on inner sides of the housing 11. For example, the housing 11 can be made of a material having good transparency and certain strength, for example, polymethyl methacrylate (PMMA), polyethylene (PE), polycarbonate (PC) etc. FIG. 2 illustrates three electrode groups 131, 132 and 133. The electronic ink sealing chamber provided by the present embodiment may be applicable to electronic paper, and the present embodiment is described with reference to the electronic paper by way of example.

A first electrode group 131 includes a first electrode 1311 and a second electrode 1312 provided opposite to the first electrode 1311; the first electrode 1311 and the second electrode 1312 of the first electrode group 131 are parallel to each other, a connection line between a center of the first electrode 1311 and a center of the second electrode 1312 of the first electrode group 131 is a first line of centers 1310. Thus, the first line of centers 1310 can be a perpendicular bisector of the first electrode 1311 and the second electrode 1312.

A second electrode group 132 includes a first electrode 1321 and a second electrode 1322 provided opposite to the first electrode 1321; the first electrode 1321 and the second electrode 1322 of the second electrode group 132 are parallel to each other; a connection line between a center of the first electrode 1321 and a center of the second electrode 1322 of the second electrode group 132 is a second line of centers 1320. Thus, the second line of centers 1320 can be a perpendicular bisector of the first electrode 1321 and the second electrode 1322.

A third electrode group 133 includes a first electrode 1331 and a second electrode 1332 provided opposite to the first electrode 1331; the first electrode 1331 and the second electrode 1332 of the third electrode group 133 are parallel to each other; a connection line between a center of the first electrode 1331 and a center of the second electrode 1332 of the third group 133 is a third line of centers 1330. Thus, the third line of centers 1330 can be a perpendicular bisector of the first electrode 1331 and the second electrode 1332.

Any two of the first line of centers 1310, the second line of centers 1320 and the third line of centers 1330 are not parallel to each other.

It should be noted that, the present embodiment is described with reference to the case where the electronic ink sealing chamber includes three electrode groups, by way of example, but the electronic ink sealing chamber also can include two or more than three electrode groups, and a number of the electrode groups can be increased or decreased according to actual needs. Furthermore, the electronic ink sealing chamber can further include other electrode groups, in addition to the electrode groups given by the present embodiment without particularly defined herein. For example, the electronic ink sealing chamber can further include another electrode group of which the line of centers is parallel to the line of centers of any one of the electrode groups provided by the present embodiment.

When the first electrode and the second electrode of each of the electrode groups are parallel to each other, a line of each of the electrode groups that is perpendicular to both of the first electrode and the second electrode is a perpendicular line, and any two of perpendicular lines of the plurality of electrode groups are not parallel to each other.

For example, the first electrode and the second electrode of each of the electrode groups can be a plane-shaped electrode. For example, both of size and shape of the first electrode and the second electrode of each of the electrode groups are the same. For example, a shape of the first electrode and the second electrode of each of the electrode groups is rectangular, and also can be other shapes. It should be noted that, a shape of the first electrode and the second electrode of each of the electrode groups is not limited by the present embodiment.

In the present embodiment, the center and the line of centers are virtual points and lines which are introduced for convenience of description only, without appearing on actual products. For example, the center refers to a center of gravity. For example, when the shape of the first electrode is rectangular, an intersection point of diagonals is the center of the first electrode; and when the shape of the second electrode is rectangular, an intersection point of diagonals is the center of the second electrode.

The electronic ink sealing chamber provided by the present embodiment overcomes the disadvantage that spherical charged particles in a conventional display device such as an electronic paper display only can be horizontally arranged, and overcomes the deficiency that a contrast ratio of a conventional display device involves a certain degree of distortion when an image is viewed in different viewing angles. In this way, the spherical charged particle can achieve absorbing and reflecting ambient light, to the greatest extent, in different viewing angles. Therefore, it can significantly decrease the loss of contrast ratio in different viewing angles, reduce the difference in contrast ratio between different viewing angles, improve picture quality in different viewing angles, and significantly improve product performance and product quality.

For example, the number of the electrode groups 13 is no less than three. With larger number of electrode groups, more viewing angles involving no significant distortion can be provided.

For example, an included angle of lines of centers of two adjacent electrode groups 13 is larger than 0 degree and less than or equal to 45 degrees. When the cross-section as illustrated in FIG. 2 is an octagon with eight equal sides, the included angle of the first line of centers 1310 and the second line of centers 1320 is 45 degrees, and the included angle of the first line of centers 1310 and the third line of centers 1330 is 45 degrees.

For example, as illustrated in FIG. 2, the electronic ink sealing chamber includes a display side 14 and a non-display side 15 provided opposite to the display side 14; the first electrodes of the plurality of electrode groups are arranged on the display side 14 in sequence, and the second electrodes of the plurality of electrode groups are arranged on the non-display side 15 in sequence. For example, as illustrated in FIG. 2, the first electrode 1321 of the second electrode group 132, the first electrode 1311 of the first electrode group 131, and the first electrode 1331 of the third electrode group 133 are arranged on the display side in sequence; and the second electrode 1322 of the second electrode group 132, the second electrode 1312 of the first electrode group 131, and the second electrode 1332 of the third electrode group 133 are arrange on the non-display side in sequence. For example, in the cross-sectional view, the first electrode and the second electrode of each of the electrode groups are arranged to be axisymmetric and/or centrosymmetric.

For example, as illustrated in FIG. 2, any two of the first electrodes of the plurality of electrode groups 13 are insulated from each other, and any two of the second electrodes of the plurality of electrode groups 13 are insulated from each other. Thus, each of the electrode groups can be applied with a voltage individually, to further control a magnitude of the voltage of each of the electrode groups independently, so that a brightness of a respective region corresponding to each of the electrode groups can be adjusted to further adjust the viewing angle of the sealing chamber. The plurality of electrode groups distributed in the sealing chamber can be used to control a rotation direction of the charged particles, so that the charged particles can reflect ambient light to the greatest extent in different viewing angles, to significantly decrease the loss of contrast ratio in different viewing angles, improve the picture quality in different viewing angles, and improve the feasibility of reading in different viewing angles.

Figure 3A:
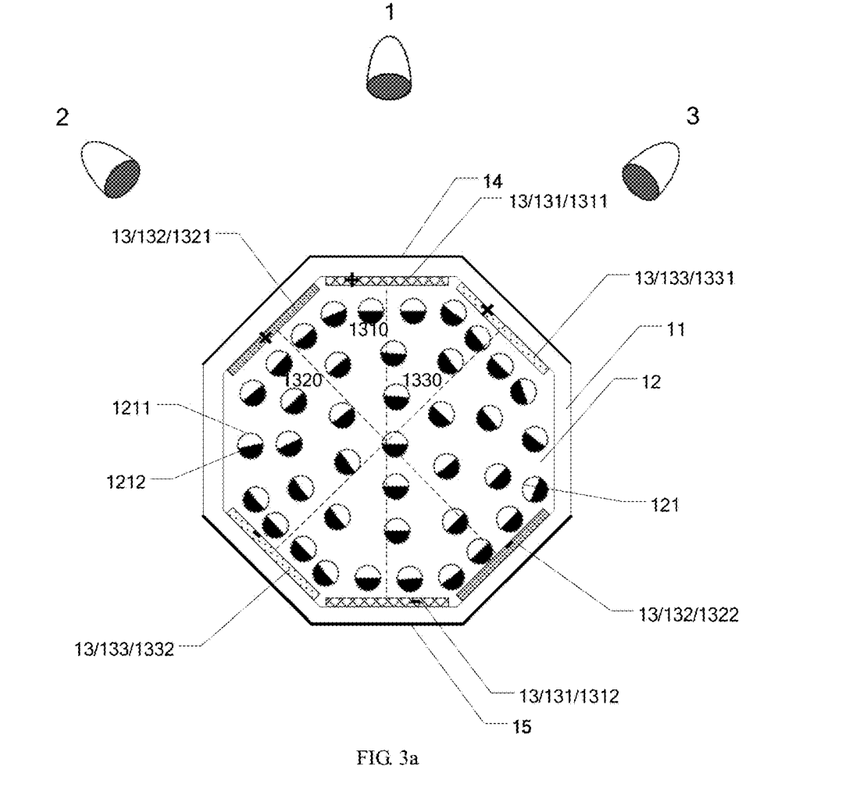
FIG. 3a is a schematic view of the electronic ink sealing chamber as illustrated in FIG. 2 which is applied with a voltage.

For example, as illustrated in FIG. 3*a*, the electronic ink 12 includes charged particles 12. The charged particle 121 is half black and half white, and includes a black portion 1211 and a black portion 1212. The black portion 121 mainly functions as absorbing light, and the white portion 1211 mainly functions as reflecting light. For example, the white portion 1211 of the charged particle (charged sphere) 121 of FIG. 3*a* carries negative charges, the black portion 1212 carries positive charges, and the charges carried by the white portion and the charges carried by the black portion are asymmetrical so that the charged particle sphere maintains one type of charge polarity as a whole, rather than electroneutrality. The charged particle 121, as a whole, carries positive charges or negative charges so that a like charges repelling effect among particles (spheres) can be utilized to prevent the particles (spheres) from gathering.

For example, the charged particle can be manufactured by adopting a micro-channel method. By utilizing a relationship of O/W type (oil-in-water type) or W/O type (water-in-oil type) between a coloring continuous phase and a spherical particlization phase, coloring continuous phases of two colors are ejected in sequence from a first micro-channel for transporting coloring continuous phase, to the spherical particlization phase of a flowing medium which is flowing in a second micro-channel, thereby manufacturing 2-hued spherical polymer particles which are two bipolarity spherical particles having + polarity and − polarity in term of electric charges.

It should be noted that, the electronic ink 12 is not limited to the above description.

For example, the first electrode and the second electrode of each of the electrode groups can be electrically connected with a drive IC, to facilitate applying a signal thereto.

As illustrated in FIG. 2, when the first electrode and the second electrode of each of the electrode groups are not applied with a voltage, the charged particles 121 in the electronic inks 12 are randomly distributed. When a voltage is applied, as illustrated in FIG. 3a, the charged particles 121 in the electronic ink 12 are arranged under the effect of the electric field. The respective voltage applied to each of the electrode groups is illustrated in Table 1.

TABLE 1 cases of applying voltages to three electrode groups

| | applied voltages (V) | |
|---|---|---|
| | first electrode | second electrode |
| first electrode group | +5 | 0 |
| second electrode group | +5 | 0 |
| third electrode group | +5 | 0 |

Figure 3B:
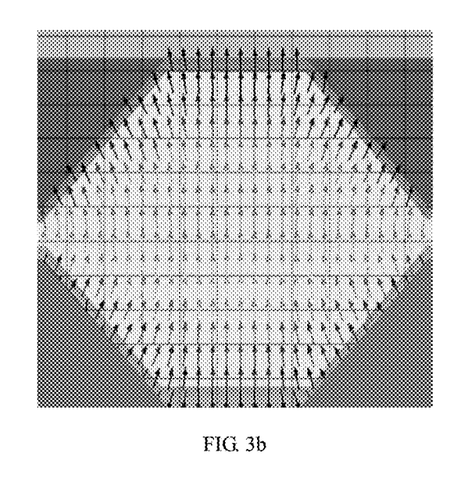
FIG. 3b is a diagram illustrating a distribution of electric field intensity of the electronic ink sealing chamber as illustrated in FIG. 3a which is applied with a voltage.

A diagram illustrating a distribution of electric field lines when applied with a voltage is simulated by a computer simulation system, and FIG. 3b illustrates a form diagram of the simulated electric field. It can be seen from FIG. 3b that, the electric field does not present vertical distribution, so the arrangement of the charged particles also presents various forms. When an image is viewed from the left side and the right side, respectively, a light reflection region of the charged particle has no significant difference from that when the image is viewed in a direction perpendicular to the image. Therefore, the ability of reflecting ambient light has no significant change compared to the case where the image is viewed in the direction perpendicular to the image. In macroscopic view, this is presented as a contrast ratio involving no significant distortion when the image is viewed in the direction not perpendicular to the image.

Figure 3C:
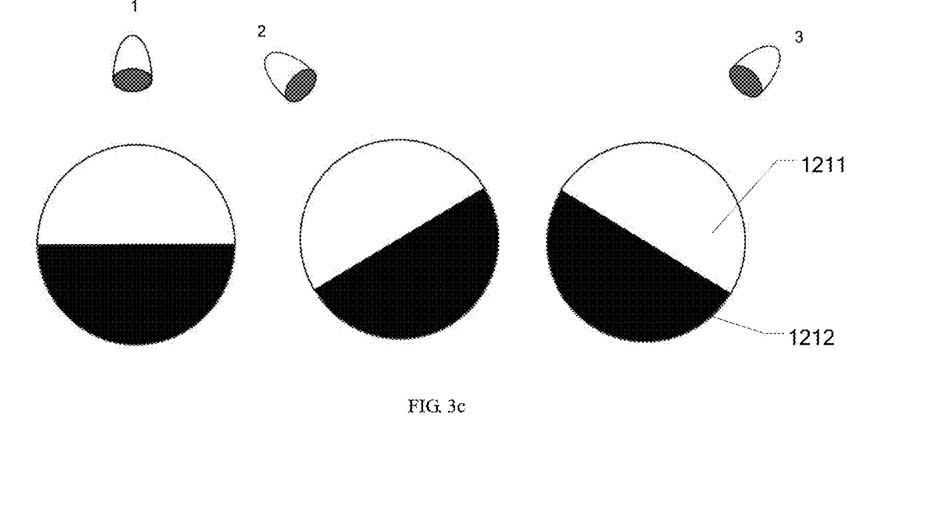
FIG. 3c is a schematic view of light reflection regions of the charged particle of the electronic ink sealing chamber as illustrated in FIG. 3a in three viewing angles.

As illustrated in FIG. 3c, the charged particles are arranged under the effect of electric field. In a first viewing angle 1, a second viewing angle 2 and a third viewing angle 3, respectively, all the white portions of the charged particles are more tended to be arranged towards a direction of the line of centers of the electrode group to which the charged particles belong. Thus, when the image is viewed in a direction not perpendicular to the image (e.g., in the second viewing angle 2 or the third viewing angle 3), the contrast ratio of the image of the display device including the sealing chamber has no significant distortion.

It should be noted that, voltage values of different electrode groups can be arbitrarily adjusted.

For example, the material of the first electrode and the second electrode includes transparent conductive material. For example, the material of the first electrode and the second electrode includes indium tin oxide (ITO), but is not limited thereto.

Figure 4A:
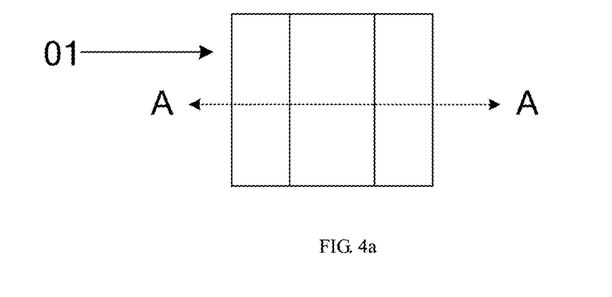
FIG. 4a is a top schematic view of an electronic ink sealing chamber provided by an embodiment of the present disclosure.
Figure 4B:
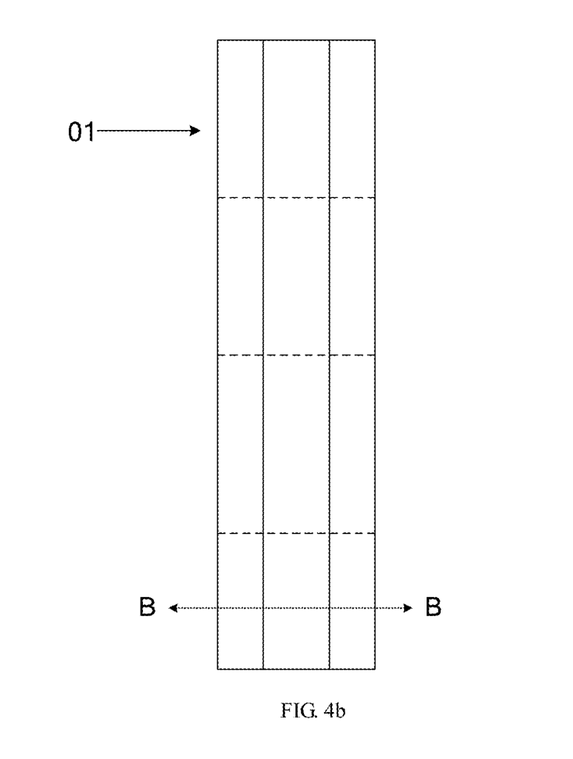
FIG. 4b is a top schematic view of another electronic ink sealing chamber provided by an embodiment of the present disclosure.
Figure 4C:
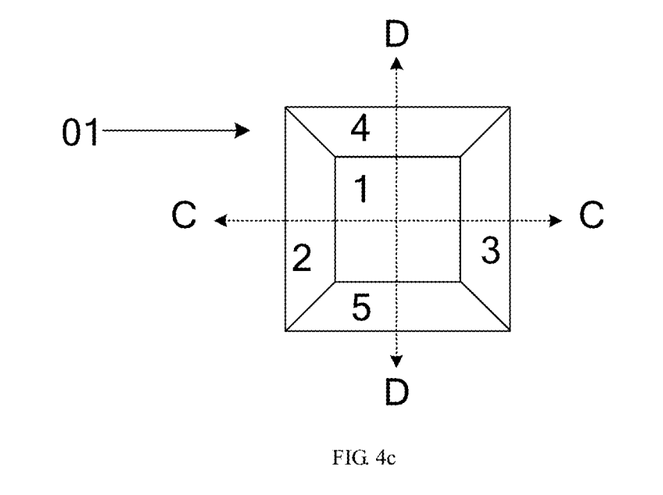
FIG. 4c is a top schematic view of yet another electronic ink sealing chamber provided by an embodiment of the present disclosure.

For example, the housing 11 has a polyhedral shape. The sealing chamber illustrated in FIG. 2 is formed as a polyhedron. A top view of the polyhedron can be as illustrated in FIG. 4a, and FIG. 2 can be a cross-sectional view along line A-A of FIG. 4a. The sealing chamber as illustrated in FIG. 4a is a sub-pixel 01. The top view of the polyhedron can also be as illustrated in FIG. 4b, and FIG. 2 can be a cross-sectional view along line B-B of FIG. 4b. The sealing chamber as illustrated in FIG. 4b shows four sub-pixels. It should be noted that, a number of the sub-pixels of FIG. 4b can also be arranged differently, for example, more than four, without particularly defined in the present embodiment. The top view of the polyhedron can also be as illustrated in FIG. 4c, and the sealing chamber as illustrated in FIG. 4c is a sub-pixel 01. FIG. 2 can be a cross-sectional view along line C-C of FIG. 4c, and a cross-sectional view along line D-D of FIG. 4c can also be as illustrated in FIG. 2. Thus, the sealing chamber includes five electrode groups. Compared to the sealing chamber as illustrated in FIG. 4a and FIG. 4b, the sealing chamber as illustrated in FIG. 4c additionally allows for a fourth viewing angle 4 and a fifth viewing angle 5, and thus has total five viewing angles. Therefore, it allows the contrast ratio of the image to involve no significant distortion when viewed in even more viewing angles.

The shape of the housing 11 can also be sphere or spheroid. It should be noted that, the shape of the housing is not limited to this, but can also be other shapes without particularly defined in the present embodiment. If the shape of the housing 11 is sphere or spheroid, the first electrode and the second electrode of each of the electrode groups are no longer parallel to each other.

Embodiment 2

Figure 5:
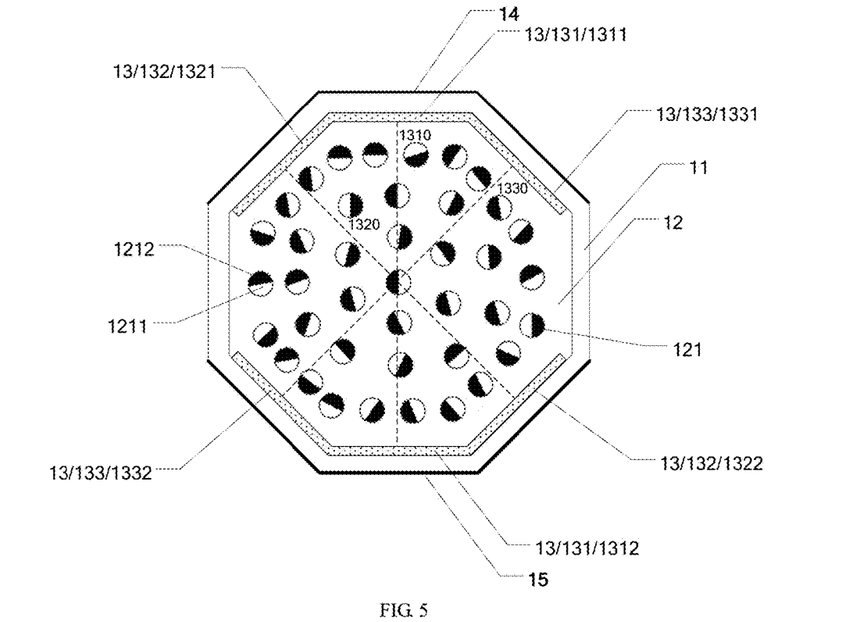
FIG. 5 is a schematic view of still another electronic ink sealing chamber provided by an embodiment of the present disclosure.

The present embodiment is different from embodiment 1 in that at least two of the first electrodes of the plurality of electrode groups 13 are electrically connected, and at least two of the second electrodes of the plurality of electrode groups 13 are electrically connected. In FIG. 5, an example in which all of the first electrodes of the plurality of electrodes groups 13 are electrically connected and all of the second electrodes of the plurality of electrodes groups 13 are electrically connected is illustrated as an example. It should be noted that, individually controlling the first electrodes and the second electrodes of a part of the plurality of electrode groups 13 while electrically connecting first electrodes of another part of the plurality of electrode groups 13 is also feasible, and correspondingly the second electrodes of the corresponding electrode groups can also be electrically connected. This is not particularly defined in the present embodiment.

Embodiment 3

The present embodiment provides a manufacturing method of an electronic ink sealing chamber, including following steps.

Figure 6:
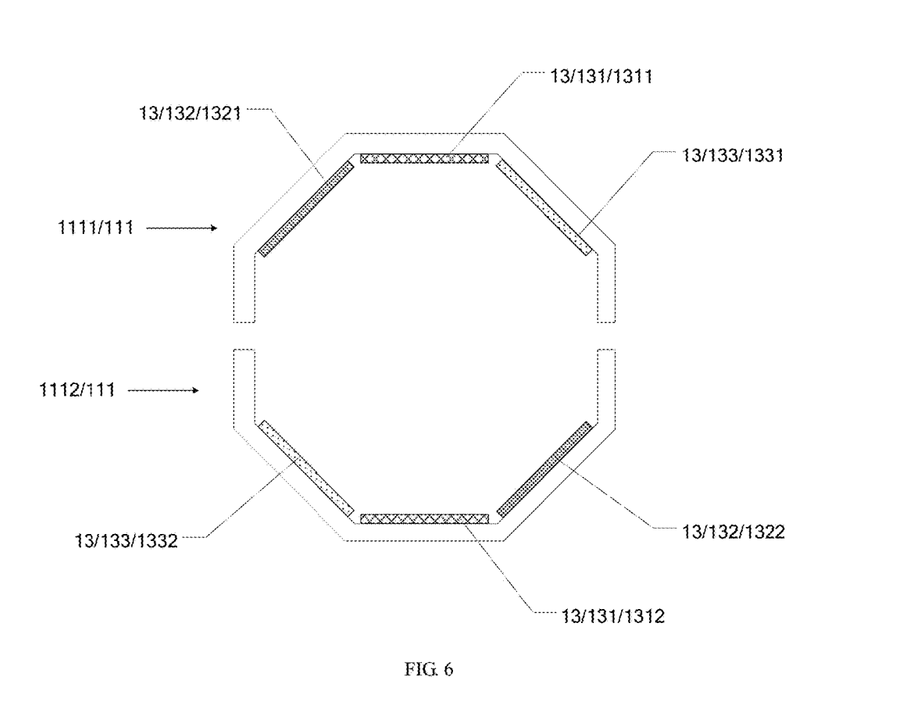
FIG. 6 is a schematic view of a housing including two sub-housings in manufacturing an electronic ink sealing chamber, provided by an embodiment of the present disclosure.

As illustrated in FIG. 6, at least one electrode is formed on a sub-housing 111; FIG. 6 illustrates two sub-housings 1111 and 1112, and each of the sub-housings includes three electrodes. Other number of sub-housings and other number of electrodes on each of the sub-housings can also be adopted according to actual needs, without limited by the present embodiment. Other reference signs in FIG. 6 can refer to the foregoing description.

The plurality of sub-housings each formed with at least one electrode are bonded together to form a chamber, and electronic ink is sealed in the formed chamber.

The at least one electrode is positioned inside the chamber, and a plurality of electrode groups 13 is formed inside the chamber. Each of the electrode groups 13 includes a first electrode and a second electrode provided opposite to the first electrode, a connection line between a center of the first electrode and a center of the second electrode of each of the electrode groups is a line of centers, and any two of lines of centers of the plurality of electrode groups 13 are not parallel to each other. For example, the lines of centers of the plurality of electrode groups 13 are intersected with each other.

The plurality of sub-housings 111 can be bonded together to form the chamber by adopting adhesive.

For example, the electronic ink can be injected into the chamber before the chamber is sealed, and then the chamber is sealed.

The material of the electrodes (the first electrode and the second electrode) of the electrode groups should be a material having good transparency and good light transmittance, for example, indium tin oxide (ITO) which has a manufacturing process similar to that of an electrode in a TFT-LCD. At least one electrode can be formed on the sub-housing 111 by a patterning process. For example, the patterning process can only include a photolithographic process, or can include the photolithographic process and also etching steps, or can include other processes such as printing and ink jetting which are adopted for forming predetermined patterns. The photolithographic process refers to a process including film formation, exposure, development etc., to form patterns by using photoresist, mask and exposure machine etc.

For example, the sub-housing 111 can be molded in advance, and then at least one electrode is formed on the sub-housing. Also, the sub-housing 111 can be molded after the at least one electrode is formed on it. This is not limited by the present embodiment.

For example, in the manufacturing method of the electronic ink sealing chamber, an included angle of the lines of centers of two adjacent electrode groups 13 is larger than 0 degree and less than or equal to 45 degrees.

For example, in the manufacturing method of the electronic ink sealing chamber, the electronic ink sealing chamber includes a display side and a non-display side provided opposite to the display side; the first electrodes of the plurality of electrode groups 13 are arranged on the display side in sequence, and the second electrodes of the plurality of electrode groups 13 are arranged on the non-display side in sequence.

For example, as illustrated in FIG. 6, in one example, in the manufacturing method of the electronic ink sealing chamber, any two of the first electrodes of the plurality of electrode groups 13 are insulated from each other, and any two of the second electrodes of the plurality of electrode groups 13 are insulated from each other.

For example, in one example, in the manufacturing method of the electronic ink sealing chamber, at least two of the first electrodes of the plurality of electrode groups 13 are electrically connected, and at least two of the second electrodes of the plurality of electrode groups 13 are electrically connected.

The electronic ink sealing chamber of the embodiment 1 or the embodiment 2 can be formed by adopting the method provided by the present embodiment.

Embodiment 4

Figure 7:
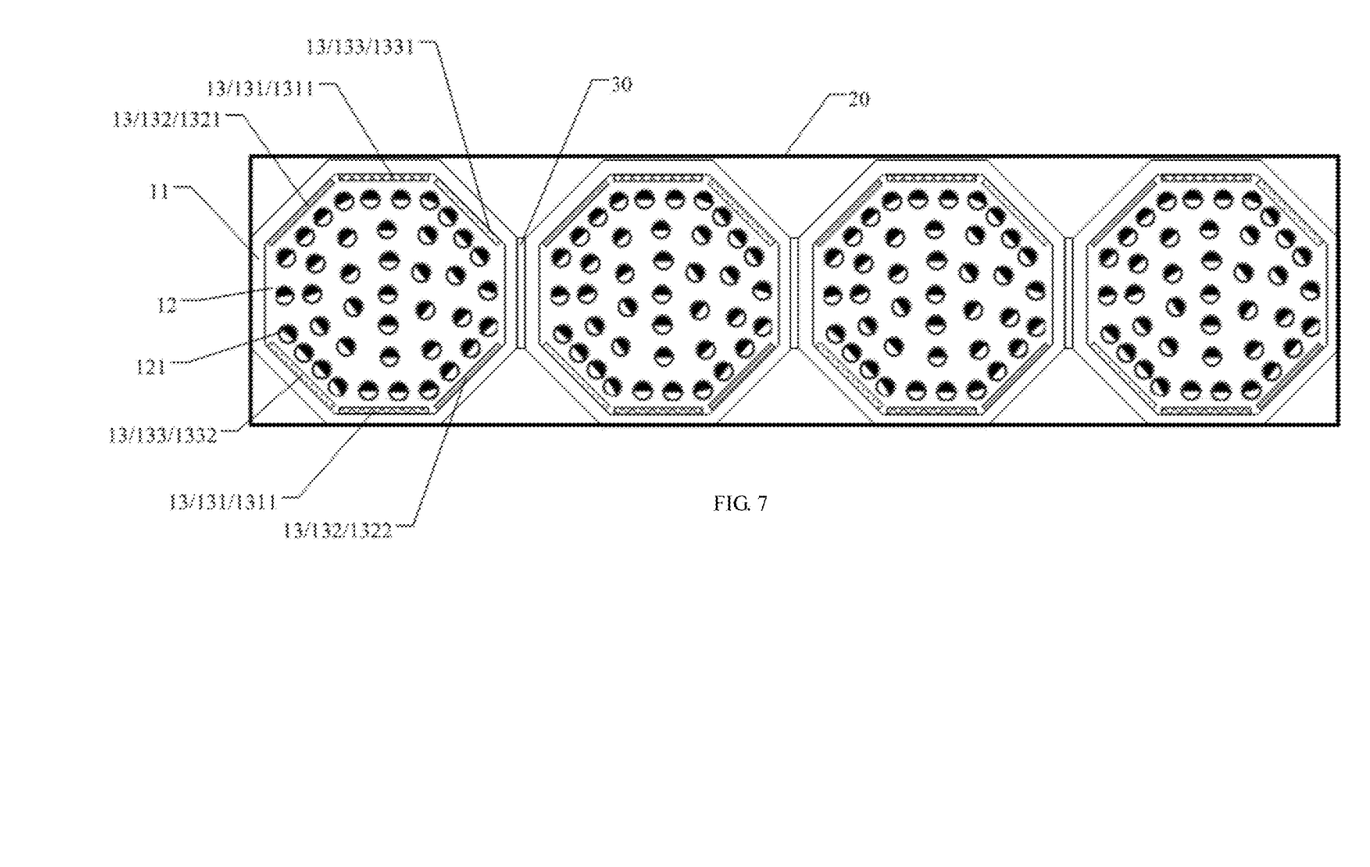
FIG. 7 is a schematic view of a display device provided by an embodiment of the present disclosure.

The present embodiment provides a display device. As illustrated in FIG. 7, the display device includes a plurality of electronic ink sealing chambers, each of the electronic ink sealing chambers can be any one in embodiment 1 or embodiment 2, and the plurality of electronic ink sealing chambers can be bonded together to form a combined body by using adhesive 30. For example, the display device includes electronic paper.

For example, a protection layer 20 is provided outside the combined body. The protection layer can adopt a material having good transparency and certain strength, for example, polymethyl methacrylate (PMMA), polyethylene (PE), polycarbonate (PC) etc. A voltage applied to the electrodes in the sealing chamber can be selected according to the shape and the number of the electrodes.

In FIG. 7, a display device including the electronic ink sealing chamber illustrated in FIG. 2 is explained by way of example. FIG. 7 illustrates an arrangement of the electronic ink under the effect of electric field in case of applying a voltage thereto.

For example, in the display device of FIG. 7, a voltage of zero can be applied to the respective first electrode of each of the electrode groups, and a positive voltage is applied to the respective second electrode of each of the electrode groups, then the charged particles are as described above. Alternatively, in the display device of FIG. 7, voltages as mentioned above are applied to each of the electrode groups, then in the electronic ink, the white portion 1211 of the charged particle carries positive charges and the black portion 1212 carries negative charges.

The display device includes a plurality of electronic ink sealing chambers, and each of the electronic ink sealing chambers includes one or more sub-pixel(s). In macroscopic view, the display device is presented as a contrast ratio of an image involving no significant distortion when the image is viewed in a direction which is not perpendicular to the image (the viewing angle is not zero).

The following statements should be noted:

(1) Unless otherwise defined, a same reference numeral represents a same meaning in the embodiments of the present disclosure and accompanying drawings.

(2) The accompanying drawings involve only the structure(s) in connection with the embodiment(s) of the present disclosure, and other structure(s) can be referred to common design(s). In addition, respective components are not limited to shapes illustrated in figures.

(3) For the purpose of clarity only, in accompanying drawings for illustrating the embodiment(s) of the present disclosure, the thickness of a layer or a region may be enlarged. However, it should understood that, in the case in which a component or element such as a layer, film, area, substrate or the like is referred to be "on" or "under" another component or element, it may be directly on or under the another component or element or a component or element is interposed there between.

(4) In case of no conflict, features in different embodiments or in one embodiment can be combined.

What are described above is the embodiments of the present disclosure only and not limitative to the scope of the present disclosure; any of those skilled in related arts can easily conceive variations and substitutions in the technical scopes disclosed by the present disclosure, which are encompassed in protection scopes of the present disclosure.

Therefore, the scopes of the present disclosure should be defined in the appended claims. The application claims priority to the Chinese patent application No. 201610697077.8 filed on Aug. 19, 2016, the entire disclosure of which is incorporated herein by reference as part of the present application.

The invention claimed is:

1. An electronic ink sealing chamber, comprising a housing in a shape of polyhedron and electronic ink sealed inside the polyhedron at least three electrode groups being provided on inner sides of the polyhedron,
   each of the electrode groups comprising a first electrode and a second electrode disposed an opposite faces of inner sides of the polyhedron, a connection line between a center of the first electrode and a center of the second electrode of each of the electrode groups being a line of centers, and any two of lines of centers of the at least three electrode groups being not parallel to each other.

2. The electronic ink sealing chamber according to claim 1, wherein an included angle of lines of centers of two adjacent electrode groups is larger than 0degree and less than or equal to 45 degrees.

3. The electronic ink sealing chamber according to claim 1, wherein the electronic ink sealing chamber comprises a display side and a non-display side provided opposite to the display side, the first electrodes of the at least three electrode groups are arranged on the display side in sequence, and the second electrodes of the at least three electrode groups are arranged on the non-display side in sequence.

4. The electronic ink sealing chamber according to claim 1, wherein any two of the first electrodes of the at least three electrode groups are insulated from each other, and any two of the second electrodes of the at least three electrode groups are insulated from each other.

5. The electronic ink sealing chamber according to claim 1, wherein at least two of the first electrodes of the at least three electrode groups are electrically connected, and at least two of the second electrodes of the at least three electrode groups are electrically connected.

6. The electronic ink sealing chamber according to claim 1, wherein the electronic ink comprises a charged particle, and the charged particle comprises a white portion and a black portion.

7. The electronic ink sealing chamber according to claim 1, wherein a material of the first electrode and the second electrode comprises a transparent conductive material.

8. A manufacturing method of an electronic ink sealing chamber, comprising:
   forming at least one electrode on a sub-housing;
   bonding a plurality of sub-housings each provided with the at least one electrode, together, to form a chamber in a shape of polyhedron, and sealing electronic ink inside the polyhedron having been formed,
   the at least one electrode being positioned inside the sealing chamber to constitute at least three electrode groups therein: each of the at least three electrode groups comprising a first electrode and a second electrode disposed on the opposite faces of inner sides of the polyhedron, a connection line between a center of the first electrode and a center of the second electrode of each of the at least three electrode groups being a line of centers, and any two of lines of centers of the plurality of electrode groups being not parallel to each other.

9. The manufacturing method of the electronic ink sealing chamber according to claim 8, wherein an included angle of lines of centers of two adjacent electrode groups is larger than 0 degree and less than or equal to 45 degrees.

10. The manufacturing method of the electronic ink sealing chamber according to claim 8, wherein the electronic ink sealing chamber comprises a display side and a non-display side provided opposite to the display side, the first electrodes of the at least three electrode groups are arranged on the display side in sequence, and the second electrodes of the at least three electrode groups are arranged on the non-display side in sequence.

11. The manufacturing method of the electronic ink sealing chamber according to claim 8, wherein any two of the first electrodes of the at least three electrode groups are insulated from each other, and any two of the second electrodes of the at least three electrode groups are insulated from each other.

12. The manufacturing method of the electronic ink sealing chamber according to claim 8, wherein at least two of the first electrodes of the at least three electrode groups are electrically connected, and at least two of the second electrodes of the at least three electrode groups are electrically connected.

13. A display device, comprising a plurality of electronic ink sealing chambers, each of the plurality of electronic ink sealing chambers being the electronic ink sealing chamber of claim 1, and the plurality of electronic ink sealing chambers being bonded together to form a combined body.

14. The display device according to claim 13, wherein a protection layer is provided outside the combination body.

15. The display device according to claim 13, wherein the display device comprises electronic paper.

16. The electronic ink sealing chamber according to claim 2, wherein the electronic ink sealing chamber comprises a display side and a non-display side provided opposite to the display side, the first electrodes of the at least three electrode groups are arranged on the display side in sequence, and the second electrodes of the at least three electrode groups are arranged on the non-display side in sequence.

17. The electronic ink sealing chamber according to claim 2, wherein any two of the first electrodes of the at least three electrode groups are insulated from each other, and any two of the second electrodes of the at least three electrode groups are insulated from each other.

18. The electronic ink sealing chamber according to claim 2, wherein at least two of the first electrodes of the at least three electrode groups are electrically connected, and at least two of the second electrodes of the at least three electrode groups are electrically connected.

19. The electronic ink sealing chamber according to claim 1, wherein the first electrode and the second electrode in each of the at least three electrode groups are parallel to each other,
   the at least three electrode groups comprises a first electrode group, a second electrode group and a third electrode group, the line of centers of the second electrode group and the line of centers of the third electrode group are symmetric with respect to the first electrode group.

* * * * *